United States Patent
Semenko et al.

(10) Patent No.: US 9,900,325 B2
(45) Date of Patent: Feb. 20, 2018

(54) PASSIVE ENCRYPTION OF ORGANIZATION DATA

(71) Applicant: Microsoft Technology Licensing, LLC, Redmond, WA (US)

(72) Inventors: Alex M. Semenko, Issaquah, WA (US); Preston Derek Adam, Woodinville, WA (US); Innokentiy Basmov, Redmond, WA (US); Narendra S. Acharya, Kirkland, WA (US); Peter J. Novotney, Seattle, WA (US); Salil Arun Bhagurkar, Redmond, WA (US); Yogesh A. Mehta, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 4 days.

(21) Appl. No.: 14/879,938

(22) Filed: Oct. 9, 2015

(65) Prior Publication Data

US 2017/0104768 A1 Apr. 13, 2017

(51) Int. Cl.
G06F 21/62 (2013.01)
H04L 29/06 (2006.01)
G06F 21/60 (2013.01)

(52) U.S. Cl.
CPC ........ H04L 63/1408 (2013.01); G06F 21/602 (2013.01); G06F 21/6209 (2013.01);
(Continued)

(58) Field of Classification Search
CPC .......................... H04L 63/1408; G06F 21/6209
See application file for complete search history.

(56) References Cited

U.S. PATENT DOCUMENTS 5,495,533 A 2/1996 Linehan et al.
5,787,131 A 7/1998 Bottomley
(Continued)

FOREIGN PATENT DOCUMENTS

CN 1653422 8/2005
CN 1713756 12/2005
(Continued)

OTHER PUBLICATIONS

"Adobe AIR 1.5 Applications with Flex—Storing Encrypted Data", Retrieved From: <http://help.adobe.com/en_US/AIR/1.5/devappsflex/WS5b3ccc516d4fbf351e63e3d118666ade46-7e31.html> May 1, 2015, Oct. 19, 2012, 2 pages.
(Continued)

Primary Examiner — David J Pearson

(57) ABSTRACT

A data protection policy is implemented on a computing device, the data protection policy indicating how organization data on the computing device is to be protected. Protection of the organization data includes encrypting the organization data, and allowing the organization data to be decrypted only by particular programs and/or under particular circumstances (as indicated by the data protection policy). When implementing a data protection policy, files already stored on the computing device are encrypted using a passive encryption technique. The passive encryption technique can include one or more of an encrypt on close technique, an encrypt on open technique, an encrypt without exclusive access technique, and an encrypt location technique.

20 Claims, 5 Drawing Sheets

(52) U.S. Cl.
CPC ........ *G06F 21/6218* (2013.01); *H04L 63/107* (2013.01); *G06F 2221/2107* (2013.01)

(56) References Cited

U.S. PATENT DOCUMENTS

| | | | |
|---|---|---|---|
| 5,897,661 A | 4/1999 | Baranovsky et al. | |
| 5,944,783 A | 8/1999 | Nieten | |
| 5,966,263 A | 10/1999 | Freitas et al. | |
| 5,974,503 A | 10/1999 | Venkatesh et al. | |
| 6,016,402 A | 1/2000 | Thomas et al. | |
| 6,028,725 A | 2/2000 | Blumenau | |
| 6,041,386 A | 3/2000 | Bello | |
| 6,067,199 A | 5/2000 | Blumenau | |
| 6,076,143 A | 6/2000 | Blumenau | |
| 6,134,062 A | 10/2000 | Blumenau | |
| 6,151,665 A | 11/2000 | Blumenau | |
| 6,170,037 B1 | 1/2001 | Blumenau | |
| 6,170,055 B1 | 1/2001 | Meyer et al. | |
| 6,253,300 B1 | 6/2001 | Lawrence et al. | |
| 6,292,317 B1 | 9/2001 | Alexander | |
| 6,292,790 B1 | 9/2001 | Krahn et al. | |
| 6,550,011 B1 | 4/2003 | Sims, III | |
| 6,665,784 B2 | 12/2003 | Ihde et al. | |
| 6,727,896 B2 | 4/2004 | Tsang | |
| 6,728,379 B1 | 4/2004 | Ishibashi et al. | |
| 6,789,162 B1 | 9/2004 | Talagala et al. | |
| 6,944,742 B1 | 9/2005 | Shoff et al. | |
| 6,968,973 B2 | 11/2005 | Uyttendaele et al. | |
| 6,996,696 B2 | 2/2006 | Shoff et al. | |
| 7,197,638 B1* | 3/2007 | Grawrock | G06F 21/6218 |
| | | | 705/51 |
| 7,356,662 B2 | 4/2008 | Shoff et al. | |
| 7,360,073 B1 | 4/2008 | Billstrom et al. | |
| 7,380,140 B1 | 5/2008 | Weissman et al. | |
| 7,382,883 B2 | 6/2008 | Cross et al. | |
| 7,409,623 B2 | 8/2008 | Baker et al. | |
| 7,451,484 B1 | 11/2008 | Nadalin et al. | |
| 7,536,536 B1 | 5/2009 | Joshi et al. | |
| 7,559,088 B2 | 7/2009 | Cohen et al. | |
| 7,580,950 B2 | 8/2009 | Kavuri et al. | |
| 7,594,087 B2 | 9/2009 | Zeevi et al. | |
| 7,646,380 B2 | 1/2010 | Tsang | |
| 7,694,134 B2 | 4/2010 | Witt et al. | |
| 7,711,923 B2 | 5/2010 | Rogers et al. | |
| 7,725,703 B2 | 5/2010 | Hunter et al. | |
| 7,757,100 B2 | 7/2010 | Weissman et al. | |
| 7,849,254 B2 | 12/2010 | Ash et al. | |
| 7,890,664 B1 | 2/2011 | Tao et al. | |
| 7,903,549 B2 | 3/2011 | Judge et al. | |
| 7,930,540 B2 | 4/2011 | Ahuja et al. | |
| 7,962,739 B2 | 6/2011 | Childs et al. | |
| 7,979,626 B2 | 7/2011 | Rogers | |
| 8,046,365 B2 | 10/2011 | Saito | |
| 8,046,533 B2 | 10/2011 | Kompella et al. | |
| 8,085,933 B2 | 12/2011 | Ferguson | |
| 8,214,656 B1 | 7/2012 | Plotkin et al. | |
| 8,234,477 B2 | 7/2012 | Shaath | |
| 8,249,257 B2 | 8/2012 | Brutch et al. | |
| 8,321,688 B2 | 11/2012 | Auradkar et al. | |
| 8,341,427 B2 | 12/2012 | Auradkar et al. | |
| 8,341,430 B2 | 12/2012 | Ureche et al. | |
| 8,387,109 B2 | 2/2013 | Ureche et al. | |
| 8,411,863 B2 | 4/2013 | Ureche et al. | |
| 8,416,954 B1 | 4/2013 | Raizen et al. | |
| 8,417,973 B2 | 4/2013 | Cooper et al. | |
| 8,423,792 B2 | 4/2013 | Luciani et al. | |
| 8,458,490 B2 | 6/2013 | Konetski et al. | |
| 8,527,561 B1 | 9/2013 | Moody, II et al. | |
| 8,538,919 B1 | 9/2013 | Nielsen et al. | |
| 8,549,271 B1 | 10/2013 | Joshi et al. | |
| 8,583,879 B2 | 11/2013 | Na et al. | |
| 8,588,422 B2 | 11/2013 | Beachem et al. | |
| 8,625,802 B2 | 1/2014 | Parann-Nissany | |
| 8,661,193 B1 | 2/2014 | Cobos et al. | |
| 8,667,213 B2 | 3/2014 | Rogers et al. | |
| 8,689,279 B2 | 4/2014 | Basmov et al. | |
| 8,726,343 B1 | 5/2014 | Borzycki et al. | |
| 8,726,407 B2 | 5/2014 | Etchegoyen | |
| 8,769,305 B2 | 7/2014 | Blaisdell | |
| 8,874,935 B2 | 10/2014 | Basmov et al. | |
| 8,875,304 B2 | 10/2014 | Celi, Jr. et al. | |
| 9,323,465 B2 | 4/2016 | Flynn et al. | |
| 9,369,289 B1 | 6/2016 | Harrison et al. | |
| 9,430,664 B2 | 8/2016 | Adam et al. | |
| 9,477,614 B2 | 10/2016 | Basmov et al. | |
| 9,537,656 B2 | 1/2017 | Debout et al. | |
| 9,740,639 B2 | 8/2017 | Basmov et al. | |
| 9,825,945 B2 | 11/2017 | Adam et al. | |
| 9,853,812 B2 | 12/2017 | Mehta et al. | |
| 9,853,820 B2 | 12/2017 | Adam et al. | |
| 2001/0000265 A1 | 4/2001 | Schreiber et al. | |
| 2002/0019935 A1 | 2/2002 | Andrew et al. | |
| 2003/0081784 A1* | 5/2003 | Kallahalla | G06F 21/6218 |
| | | | 380/277 |
| 2003/0084298 A1 | 5/2003 | Messerges et al. | |
| 2003/0196114 A1 | 10/2003 | Brew et al. | |
| 2003/0221095 A1 | 11/2003 | Gaunt et al. | |
| 2004/0044912 A1 | 3/2004 | Connary et al. | |
| 2004/0090811 A1 | 5/2004 | Kang | |
| 2004/0146015 A1 | 7/2004 | Cross et al. | |
| 2004/0174345 A1 | 9/2004 | Tsang | |
| 2005/0071280 A1 | 3/2005 | Irwin et al. | |
| 2005/0091661 A1 | 4/2005 | Kurien et al. | |
| 2005/0097341 A1 | 5/2005 | Francis et al. | |
| 2005/0213377 A1 | 9/2005 | Shoff et al. | |
| 2005/0262361 A1 | 11/2005 | Thibadeau | |
| 2005/0265074 A1 | 12/2005 | Shoff et al. | |
| 2005/0283730 A1 | 12/2005 | Uyttendaele et al. | |
| 2006/0101027 A1 | 5/2006 | Hotchkiss | |
| 2006/0155919 A1 | 7/2006 | Lasser et al. | |
| 2006/0190984 A1 | 8/2006 | Heard et al. | |
| 2006/0206507 A1 | 9/2006 | Dahbour | |
| 2006/0277590 A1 | 12/2006 | Limont et al. | |
| 2006/0279556 A1 | 12/2006 | Tsang | |
| 2007/0028231 A1 | 2/2007 | Kelso et al. | |
| 2007/0058806 A1 | 3/2007 | Ferguson | |
| 2007/0150886 A1 | 6/2007 | Shapiro | |
| 2007/0244940 A1 | 10/2007 | Devarakonda et al. | |
| 2007/0250678 A1 | 10/2007 | Ueoka et al. | |
| 2007/0300008 A1 | 12/2007 | Rogers et al. | |
| 2007/0300037 A1 | 12/2007 | Rogers et al. | |
| 2008/0002830 A1 | 1/2008 | Cherkasov et al. | |
| 2008/0005467 A1 | 1/2008 | Morley et al. | |
| 2008/0010468 A1 | 1/2008 | Ruiz | |
| 2008/0082448 A1 | 4/2008 | Meijer et al. | |
| 2008/0083036 A1 | 4/2008 | Ozzie et al. | |
| 2008/0107262 A1 | 5/2008 | Helfman et al. | |
| 2008/0130156 A1 | 6/2008 | Chu et al. | |
| 2008/0141040 A1 | 6/2008 | Biddle et al. | |
| 2008/0155316 A1 | 6/2008 | Pawar et al. | |
| 2008/0168315 A1 | 7/2008 | Mead et al. | |
| 2008/0229428 A1 | 9/2008 | Camiel | |
| 2008/0240253 A1 | 10/2008 | Au et al. | |
| 2008/0240441 A1 | 10/2008 | Kawakami | |
| 2008/0263371 A1 | 10/2008 | Weissman et al. | |
| 2008/0301470 A1 | 12/2008 | Green et al. | |
| 2009/0024795 A1 | 1/2009 | Kobara | |
| 2009/0063756 A1 | 3/2009 | Asipov | |
| 2009/0075630 A1 | 3/2009 | McLean | |
| 2009/0132474 A1 | 5/2009 | Ma et al. | |
| 2009/0205012 A1 | 8/2009 | Jain et al. | |
| 2009/0210267 A1 | 8/2009 | Fish et al. | |
| 2009/0287874 A1 | 11/2009 | Rogers et al. | |
| 2009/0307563 A1 | 12/2009 | Marquez et al. | |
| 2010/0082898 A1 | 4/2010 | Mangold et al. | |
| 2010/0100721 A1 | 4/2010 | Su et al. | |
| 2010/0107213 A1 | 4/2010 | Ureche | |
| 2010/0169948 A1 | 7/2010 | Budko et al. | |
| 2010/0250847 A1 | 9/2010 | Chen | |
| 2010/0266132 A1 | 10/2010 | Bablani et al. | |
| 2010/0299152 A1 | 11/2010 | Batchu et al. | |
| 2010/0306175 A1 | 12/2010 | Johnson et al. | |
| 2010/0332725 A1 | 12/2010 | Post et al. | |
| 2011/0010560 A1 | 1/2011 | Etchegoyen | |

(56) References Cited

U.S. PATENT DOCUMENTS

| | | |
|---|---|---|
| 2011/0035577 A1 | 2/2011 | Lin et al. |
| 2011/0055559 A1 | 3/2011 | Li et al. |
| 2011/0055560 A1 | 3/2011 | Meissner et al. |
| 2011/0060915 A1 | 3/2011 | Tal |
| 2011/0078760 A1 | 3/2011 | De Perthuis |
| 2011/0087890 A1 | 4/2011 | Munsil et al. |
| 2011/0154023 A1 | 6/2011 | Smith et al. |
| 2011/0202916 A1 | 8/2011 | VoBa et al. |
| 2011/0225431 A1 | 9/2011 | Stufflebeam, Jr. et al. |
| 2011/0225640 A1 | 9/2011 | Ganapathy et al. |
| 2011/0246785 A1 | 10/2011 | Linsley et al. |
| 2011/0247047 A1 | 10/2011 | Loureiro et al. |
| 2011/0252232 A1 | 10/2011 | De Atley et al. |
| 2011/0264925 A1 | 10/2011 | Russo et al. |
| 2011/0276683 A1 | 11/2011 | Goldschlag et al. |
| 2011/0277013 A1 | 11/2011 | Chinta |
| 2012/0017095 A1 | 1/2012 | Blenkhorn et al. |
| 2012/0036347 A1 | 2/2012 | Swanson et al. |
| 2012/0036370 A1 | 2/2012 | Lim et al. |
| 2012/0079603 A1 | 3/2012 | Brown et al. |
| 2012/0087033 A1 | 4/2012 | Yang |
| 2012/0110345 A1* | 5/2012 | Pigeon ............... H04L 63/0435 713/189 |
| 2012/0159148 A1 | 6/2012 | Behren et al. |
| 2012/0173882 A1 | 7/2012 | Horn et al. |
| 2012/0239618 A1 | 9/2012 | Kung |
| 2012/0297190 A1 | 11/2012 | Shen et al. |
| 2012/0331550 A1 | 12/2012 | Raj et al. |
| 2013/0013856 A1 | 1/2013 | Rogers et al. |
| 2013/0054977 A1 | 2/2013 | Basmov |
| 2013/0054979 A1 | 2/2013 | Basmov |
| 2013/0061035 A1 | 3/2013 | Hook et al. |
| 2013/0067242 A1 | 3/2013 | Lyakhovitskiy et al. |
| 2013/0074142 A1 | 3/2013 | Brennan et al. |
| 2013/0086691 A1 | 4/2013 | Fielder |
| 2013/0091543 A1* | 4/2013 | Wade .................... G06F 21/54 726/1 |
| 2013/0117561 A1 | 5/2013 | Chawla et al. |
| 2013/0117805 A1 | 5/2013 | Kent et al. |
| 2013/0124859 A1 | 5/2013 | Pestoni et al. |
| 2013/0138971 A1 | 5/2013 | Budko et al. |
| 2013/0198474 A1 | 8/2013 | Shaath |
| 2013/0208893 A1 | 8/2013 | Shablygin et al. |
| 2013/0283392 A1 | 10/2013 | Mirashrafi et al. |
| 2013/0291055 A1 | 10/2013 | Muppidi et al. |
| 2013/0318359 A1 | 11/2013 | Morris et al. |
| 2014/0007182 A1* | 1/2014 | Qureshi .................. G06F 21/10 726/1 |
| 2014/0007222 A1 | 1/2014 | Qureshi et al. |
| 2014/0019753 A1 | 1/2014 | Lowry et al. |
| 2014/0032691 A1 | 1/2014 | Barton et al. |
| 2014/0032759 A1 | 1/2014 | Barton et al. |
| 2014/0032933 A1 | 1/2014 | Smith et al. |
| 2014/0041046 A1 | 2/2014 | Vantalon et al. |
| 2014/0059690 A1 | 2/2014 | Li et al. |
| 2014/0075493 A1 | 3/2014 | Krishnan et al. |
| 2014/0081980 A1 | 3/2014 | Aad |
| 2014/0109178 A1* | 4/2014 | Barton ................ G06F 9/45533 726/1 |
| 2014/0156705 A1 | 6/2014 | Beecham et al. |
| 2014/0156706 A1 | 6/2014 | Beecham et al. |
| 2014/0164774 A1 | 6/2014 | Nord et al. |
| 2014/0181512 A1 | 6/2014 | Spalka et al. |
| 2014/0230007 A1 | 8/2014 | Roth et al. |
| 2014/0259117 A1 | 9/2014 | Wachendorf et al. |
| 2014/0344570 A1 | 11/2014 | Adam et al. |
| 2014/0344571 A1 | 11/2014 | Adam et al. |
| 2014/0359793 A1* | 12/2014 | Dobson ............... G06F 21/6245 726/30 |
| 2015/0033039 A1 | 1/2015 | Basmov et al. |
| 2015/0160879 A1 | 6/2015 | Flynn et al. |
| 2015/0186657 A1 | 7/2015 | Nakhjiri |
| 2015/0270956 A1 | 9/2015 | Basmov et al. |
| 2015/0278531 A1 | 10/2015 | Smith et al. |
| 2016/0072796 A1 | 3/2016 | Adam et al. |
| 2016/0080149 A1 | 3/2016 | Mehta et al. |
| 2016/0127327 A1 | 5/2016 | Mehta et al. |
| 2016/0154744 A1 | 6/2016 | Zheng et al. |
| 2016/0173281 A1 | 6/2016 | White et al. |
| 2016/0255079 A1 | 9/2016 | Harrison et al. |
| 2016/0283406 A1 | 9/2016 | Linga et al. |
| 2017/0004094 A1 | 1/2017 | Basmov et al. |
| 2017/0005809 A1 | 1/2017 | Adam et al. |

FOREIGN PATENT DOCUMENTS

| | | |
|---|---|---|
| CN | 102646077 | 8/2012 |
| CN | 103092664 | 5/2013 |
| CN | 103092938 | 5/2013 |
| CN | 103500116 | 1/2014 |
| CN | 103577567 | 2/2014 |
| EP | 2393033 | 12/2011 |
| EP | 2448303 | 5/2012 |
| EP | 2509275 | 10/2012 |
| EP | 2562675 | 2/2013 |
| EP | 2680487 | 1/2014 |
| TW | 200519595 | 6/2005 |
| TW | 200723093 | 6/2007 |
| TW | 201032559 | 9/2010 |
| TW | I540453 | 7/2016 |
| WO | WO-0049488 | 8/2000 |
| WO | 2004034184 A2 | 4/2004 |
| WO | WO-2004107646 | 12/2004 |
| WO | WO-2009069043 | 6/2009 |
| WO | WO-2009149019 | 12/2009 |
| WO | WO-2012016091 | 2/2012 |
| WO | WO-2012167392 | 12/2012 |

OTHER PUBLICATIONS

"BitLocker Drive Encryption in Windows Vista", Microsoft TechNet, retrieved from <http://technet.microsoft.com/en-us/library/cc725719(WS.10).aspx> on Apr. 25, 2011, Aug. 6, 2010, 9 pages.

"Blackberry 10", Retrieved from <http://en.wikipedia.org/wiki/BlackBerry_10#BlackBerry_Balance> on Apr. 2, 2013, Apr. 1, 2013, 8 pages.

"Divide: The Next Generation of Enterprise Mobility", Retrieved at <<http://www.divide.com/download/Divide_Product_Sheet_1116.pdf<< on May 8, 2013, Jan. 20, 2013, 2 pages.

"Exchange ActiveSync", Retrieved from <http://en.wikipedia.org/wiki/Exchange_ActiveSync> on Apr. 1, 2013, Apr. 1, 2013, 5 pages.

"Exchange ActiveSync: Provisioning Protocol", Retrieved from <http://msdn.microsoft.com/en-us/library/dd299443(v=Exchg.80).aspx> on Apr. 1, 2013, Dec. 3, 2008, 4 Pages.

"Extended European Search Report", EP Application No. 11871440.1, dated Mar. 16, 2015, 5 pages.

"Extended European Search Report", EP Application No. 11871825.3, dated May 11, 2015, 7 pages.

"Final Office Action", U.S. Appl. No. 13/221,629, dated Dec. 23, 2013, 24 pages.

"Final Office Action", U.S. Appl. No. 13/898,368, dated Apr. 16, 2015, 16 pages.

"Foreign Notice of Allowance", CN Application No. 201210314631.1, dated Aug. 20, 2015, 4 pages.

"Foreign Notice of Allowance", CN Application No. 201210314748.X, dated Jul. 3, 2015, 3 pages.

"Foreign Office Action", CN Application No. 201210314631.1, dated Dec. 1, 2014, 14 pages.

"Foreign Office Action", CN Application No. 201210314748.X, dated Mar. 17, 2015, 7 pages.

"Foreign Office Action", CN Application No. 201210314748.X, dated Sep. 23, 2014, 14 Pages.

"Foreign Office Action", TW Application No. 100136564, dated Oct. 20, 2015, 11 pages.

"How Can We Ensure Data Security on Mobile Devices??", Retrieved From: <http://enterprise.huawei.com/topic/byod_en/solution_byod_info_3.html> Mar. 6, 2014, Jun. 16, 2013, 4 Pages.

(56) References Cited

OTHER PUBLICATIONS

"How Do I Prevent 'Sensitive Data Exposure'?", Retrieved From: <https://www.owasp.org/index.php/Top_10_2013-A6-Sensitive_Data_Exposure> May 12, 2015, Jun. 23, 2013, 2 pages.

"InnoSetup Help", Retrieved From: <http://www.jrsoftware.org/ishelp/index.php?topic=filessection> May 12, 2015, 8 pages.

"International Search Report and Written Opinion", Application No. PCT/US2013/061053, dated Jan. 30, 2014, 10 Pages.

"International Search Report and Written Opinion", Application No. PCT/US2015/021125, dated Jul. 3, 2015, 9 Pages.

"International Search Report and Written Opinion", Application No. PCT/US2011/055600, dated Jul. 30, 2012, 9 pages.

"International Search Report and Written Opinion", Application No. PCT/US2011/055626, dated Sep. 19, 2012, 9 pages.

"Mobile Device Management", Retrieved from <http://www.bing.com/search?q=mobile+device+management&src=IE-TopResult&Form=IE10TR> on Apr. 2, 2013, 2013, 2 pages.

"MobileIron Introduces the First Complete Mobile App Persona for the Enterprise", Retrieved from <http://www.mobileiron.com/en/company/press-room/press-releases/371-mobileiron-introduces-the-first-complete-mobile-app-persona-for-the-enterprise> on Mar. 25, 2013, Nov. 6, 2012, 2 pages.

"Non-Final Office Action", U.S. Appl. No. 13/221,629, dated May 17, 2013, 27 pages.

"Non-Final Office Action", U.S. Appl. No. 13/221,699, dated Apr. 1, 2013, 16 pages.

"Non-Final Office Action", U.S. Appl. No. 13/898,368, dated Aug. 4, 2015, 17 pages.

"Non-Final Office Action", U.S. Appl. No. 13/898,368, dated Dec. 8, 2014, 12 pages.

"Non-Final Office Action", U.S. Appl. No. 13/933,928, dated Oct. 21, 2015, 11 pages.

"Non-Final Office Action", U.S. Appl. No. 14/221,105, dated Aug. 4, 2015, 25 pages.

"Non-Final Office Action", U.S. Appl. No. 14/489,288, dated Nov. 6, 2015, 25 pages.

"Non-Final Office Action", U.S. Appl. No. 14/506,167, dated Jun. 29, 2015, 16 pages.

"Notice of Allowance", U.S. Appl. No. 13/221,629, dated Jun. 27, 2014, 16 pages.

"Notice of Allowance", U.S. Appl. No. 13/221,699, dated Oct. 30, 2013, 9 pages.

"OMA Device Management", Retrieved from <http://en.wikipedia.org/wiki/OMA_DM> on Apr. 2, 2013, Mar. 25, 2013, 4 Pages.

"OMA Device Management", Retrieved from <http://msdn.microsoft.com/en-us/library/bb737369.aspx>, Aug. 4, 2010, 4 Pages.

"Search Report", TW Application No. 100136565, dated Aug. 3, 2015, 1 pages.

"Securing end-user mobile devices in the enterprise", In Proceedings: Thought Leadership White Paper, IBM Global Technology Services, Apr. 2011, 6 Pages.

"Security Solutions and Services", retrieved from <http://www.csc.com/public_sector/offerings/11043/17449-security_solutions_and_services> on Apr. 25, 2011, 2 pages.

"ThoriumCloud Enterprise Container", Retrieved from <http://www.thoriumcloud.com/> on Mar. 25, 2013, 2013, 4 Pages.

"Unlock BitLocker under Windows PC", Retrieved from: <http://windows7migration.info/index.php option=com_content&view=article&id=1836:unlock-bitlocker-under-windows-pe&catid=42:4sysops&Itemid=61> on Aug. 4, 2011, 5 pages.

"Various Mobile Device Management (MDM) Solutions", Retrieved From: <http://www.bing.com/search?q=mobile+device+management&src=IE-TopResult&FORM=IE10TR> Mar. 5, 2014, 2 Pages.

"What Android Sync'd Data is Encrypted?", Retrieved From: <http://android.stackexchange.com/questions/3129/what-android-syncd-data-is-encrypted>, Nov. 25, 2010, 3 pages.

"Windows Selective Wipe for Device Data Management", Retrieved from <http://technet.microsoft.com/en-us/library/dn486874.aspx>, Nov. 1, 2013, 4 pages.

Becher,"Mobile Security Catching Up? Revealing the Nuts and Bolts of the Security of Mobile Devices", Proceedings of IEEE Symposium on Security and Privacy, May 22, 2011, pp. 96-111.

Bugiel,"Practical and Lightweight Domain Isolation on Android", Proceedings of the 1st ACM Workshop on Security and privacy in Smartphones and Mobile Devices, Oct. 17, 2011, 12 pages.

Gudeth,"Delivering Secure Applications on Commercial Mobile Devices: The Case for Bare Metal Hypervisors", Proceedings of the 1st ACM Workshop on Security and privacy in Smartphones and Mobile Devices, Oct. 17, 2011, pp. 33-38.

Lawson,"Meeting Regulatory Compliance Challenges with Data Management Tools Solutions", YL & A, www.ylassoc.com, available at <ftp://public.dhe.ibm.com/software/data/db2imstools/solutions/lawson-reg-compliance.pdf>, Sep. 19, 2006, pp. 1-18.

Li,"Managing Data Retention Policies at Scale", IFIP/IEEE International Symposium on Integrated Network Management 2011, Dublin, Ireland, May 23-27, 2011., available at <http://www.hpl.hp.com/techreports/2010/HPL-2010-203.pdf>, Dec. 21, 2010, 9 pages.

Li,"Scalable and Secure Sharing of Personal Health Records in Cloud Computing Using Attribute-Based Encryption", IEEE Transactions on Parallel and Distributed Systems, vol. 24, Issue 1, Jan. 2013, pp. 131-143.

Mitchell,"What is a Selective Wipe?", Retrieved from <http://www.landesk.com/blog/what-is-a-selective-wipe/> on Mar. 25, 2013, Apr. 30, 2012, 1 page.

Mont,"A Systemic Approach to Privacy Enforcement and Policy Compliance Checking in Enterprises", Trusted Systems Laboratory, HP Laboratories Bristol, HPL-2006-44, available at <http://www.hpl.hp.com/techreports/2006/HPL-2006-44.pdf>, Mar. 16, 2006, 11 pages.

Oberheide,"When Mobile is Harder Than Fixed (and Vice Versa): Demystifying Security Challenges in Mobile Environments", Proceedings of Eleventh International Workshop on Mobile Computing Systems and Applications, Feb. 22, 2010, 6 pages.

Pecherle,"Data Wiping System with Fully Automated, Hidden and Remote Destruction Capabilities", In Journal of WSEAS Transactions on Computers, vol. 9, Issue 9, Available at <http://www.wseas.us/e-library/transactions/computers/2010/88-110.pdf>, Sep. 2010, pp. 939-948.

Pisko,"Trusted Computing in Mobile Platforms—Players, Usage Scenarios, and Interests", Proceedings of Privacy and Security, Sep. 2005, pp. 526-530.

Purdy,"Thumb Drive", Retrieved From: <http://lifehackercom/5583307/top-10-usb-thumb-drive-tricks-2010-edition> May 12, 2015, Oct. 7, 2010, 6 pages.

Reardon,"Secure Deletion on Log-structured File Systems", In Proceedings: Technical Report, Department of Computer Science, ETH Zurich Available at: <http://arxiv.org/pdf/1106.0917.pdf>, Jun. 5, 2011, 11 pages.

Stehle,"Provisioning, Policies, Remote Wipe, and the Allow/Block/Quarantine list in Exchange ActiveSync", Retrieved from <http://msdn.microsoft.com/en-us/library/exchange/hh509085(v=exchg.140).aspx> on Apr. 1, 2013, 2013, 20 pages.

Stockton,"Divide and your Data: Privacy, Sync, Backup, Restore, Storage and Wipe", Retrieved from <http://support.divide.com/entries/20964987-Divide-and-your-data-privacy-sync-backup-restore-storage-and-wipe> on Mar. 25, 2013, Feb. 8, 2012, 2 pages.

Toegl,"acTvSM: A Dynamic Virtualization Platform for Enforcement of Application Integrity", Lecture Notes in Computer Science vol. 6802, 2011, Retrieved from <https://online.tugraz.at/tug_online/voe_main2.getvolltext?pCurrPk=60165>, 2011, 20 pages.

Zeis,"The security of BlackBerry Balance", Retrieved From: <http://crackberry.com/security-blackberry-balances Mar. 6, 2014, Aug. 2, 2013, 13 pages.

"Final Office Action", U.S. Appl. No. 14/481,672, dated Feb. 9, 2017, 16 pages.

"Final Office Action", U.S. Appl. No. 14/506,167, dated Nov. 23, 2015, 19 pages.

(56) References Cited

OTHER PUBLICATIONS

"Final Office Action", U.S. Appl. No. 14/533,921, dated Feb. 24, 2017, 15 pages.
"Foreign Notice of Allowance", TW Application No. 110501128, dated Dec. 29, 2016, 4 pages.
"Non-Final Office Action", U.S. Appl. No. 14/221,105, dated Feb. 24, 2017, 42 pages.
"Non-Final Office Action", U.S. Appl. No. 14/489,288, dated Jan. 19, 2017, 30 pages.
Kher,"Securing Distributed Storage: Challenges, Techniques, and Systems", ACM Workshop on Storage security and survivability, 2005, p. 9-25.
Sharma,"TransCrypt: Design of a Secure and Transparent Encrypting File System", Master's Thesis, Indian Institute of Technology Kanpur, Aug. 2006, 50 pages.
"Final Office Action", U.S. Appl. No. 13/898,368, dated Dec. 2, 2015, 19 pages.
"International Preliminary Report on Patentability", Application No. PCT/US2013/061053, dated Nov. 24, 2015, 8 pages.
"International Search Report and Written Opinion", Application No. PCT/US2015/049981, dated Dec. 3, 2015, 11 pages.
Menezes,"Handbook of Applied Cryptography", CRC Press LLC,, Jan. 1, 1997, pp. 25-27 & 551-553.
"Advisory Action", U.S. Appl. No. 14/506,167, dated Apr. 13, 2016, 3 pages.
"Final Office Action", U.S. Appl. No. 14/221,105, dated Feb. 22, 2016, 35 pages.
"Foreign Notice of Allowance", TW Application No. 100136564, dated Feb. 25, 2016, 4 pages.
"International Search Report and Written Opinion", Application No. PCT/US2015/058707, dated Jan. 20, 2016, 11 Pages.
"International Search Report and Written Opinion", Application No. PCT/US2015/048750, dated Apr. 11, 2016, 22 pages.
"Second Written Opinion", Application No. PCT/US2015/021125, dated Feb. 2, 2016, 6 pages.
Chen,"Hardware-Assisted Application-Level Access Control", ISC '09 Proceedings of the 12th International Conference on Information Security, 090/7/2009, 16 pages.
"Final Office Action", U.S. Appl. No. 14/489,288, dated Jun. 15, 2016, 25 pages.
"Foreign Notice of Allowance", TW Application No. 100136565, dated Mar. 25, 2016, 4 pages.
"International Preliminary Report on Patentability", Application No. PCT/US2015/021125, dated May 11, 2016, 7 pages.
"Non-Final Office Action", U.S. Appl. No. 14/533,921, dated Apr. 19, 2016, 18 pages.
"Notice of Allowance", U.S. Appl. No. 13/933,928, dated Apr. 22, 2016, 8 pages.
"Batch File Encrypt—Encrypt and decrypt whole files or their parts using symmetric algorithms", Retrieved at: https://web.archive.org/web/20131217055640/http://www.binarymark.com/products/batchfileencrypt/default.aspx—on Dec. 15, 2016, Dec. 17, 2013, 21 pages.
"File locking—Wikipedia", Retrieved at: https://en.wikipedia.org/w/index.php?title=File_locking&oldid=679856482—on Dec. 15, 2016, 5 pages.
"International Preliminary Report on Patentability", Application No. PCT/US2015/048750, dated Dec. 6, 2016, 11 pages.
"International Preliminary Report on Patentability", Application No. PCT/US2015/049981, dated Oct. 18, 2016, 6 pages.
"International Preliminary Report on Patentability", Application No. PCT/US2015/058707, dated Oct. 27, 2016, 7 pages.
"International Search Report and Written Opinion", Application No. PCT/US2016/054036, dated Dec. 1, 2016, 12 pages.
"Second Written Opinion", Application No. PCT/US2016/039468, dated Dec. 1, 2016, 5 pages.
"Corrected Notice of Allowance", U.S. Appl. No. 14/506,167, dated Sep. 7, 2016, 2 pages.
"Examiner's Answer to Appeal Brief", U.S. Appl. No. 13/898,368, dated Sep. 8, 2016, 7 pages.
"Foreign Office Action", TW Application No. 105101128, dated Aug. 23, 2016, 5 pages.
"Non-Final Office Action", U.S. Appl. No. 14/481,672, dated Jul. 28, 2016, 12 pages.
"Notice of Allowance", U.S. Appl. No. 14/506,167, dated Jun. 22, 2016, 11 pages.
"Restriction Requirement", U.S. Appl. No. 14/481,672, dated Jun. 28, 2016, 6 pages.
"Second Written Opinion", U.S. Appl. No. PCT/US2015/049981, dated Jul. 26, 2016, 5 pages.
"Corrected Notice of Allowance", U.S. Appl. No. 14/506,167, dated Sep. 27, 2016, 2 pages.
"International Search Report and Written Opinion", Application No. PCT/US2016/039468, dated Sep. 1, 2016, 10 pages.
"Non-Final Office Action", U.S. Appl. No. 14/788,377, dated Sep. 23, 2016, 14 pages.
"Non-Final Office Action", U.S. Appl. No. 15/266,591, dated Oct. 12, 2016, 10 pages.
"Second Written Opinion", Application No. PCT/US2015/048750, dated Aug. 8, 2016, 9 pages.
Lane, Adrian, "Cracking the Confusion: Encryption Layers", Published on: Feb. 12, 2015 Available at: https://securosis.com/blog/cracking-the-confusion-encryption-layers.
"About EFS (Encrypting File System)", Published on: Oct. 28, 2014 Available at: https://www.elcomsoft.com/help/en/aefsdr/about_efs.html.
"CheckVision Enterprise Encryption", Published on: Apr. 24, 2013 Available at: http://assets1.csc.com/banking/downloads/CardsPayments_CheckVisionEnterprise_DS.pdf.
Wahl, Peter, "Oracle Advanced Security Transparent Data Encryption Best Practices", In Oracle White Paper, Jul. 2012, 29 pages.
Kalogeropoulos, John, "Oracle Data Pump Encrypted Dump File Support", In Oracle White Paper, Jul. 2011, 15 pages.
"DataStax Enterprise 3.2", Retrieved on: Jul. 23, 2015 Available at: http://docs.datastax.com/en/datastax_enterprise/3.2/datastax_enterprise/sec/secTDE.html.
"Application Encryption-Vormetric Data Security Products", Published on: Jun. 27, 2014 Available at: http://www.vormetric.com/products/vormetric-application-encryption.
"Oracle Advanced Security", Published on: Apr. 16, 2011 Available at: http://www.oracle.com/technetwork/database/security/ds-advanced-security-tde-psft-129631.pdf.
"Transparent Data Encryption (TDE)", Retrieved on: Jul. 23, 2015 Available at https://msdn.microsoft.com/en-in/library/bb934049.aspx.
"Approaches for Encryption of Data at Rest in the Enterprise", In White Papers, Jan. 2008, pp. 1-24.
Magnabosco, John, "Transparent Data Encryption", Published on: Mar. 16, 2010 Available at: https://www.simple-talk.com/sql/database-administration/transparent-data-encryption/.
Adam, Derek, "Enterprise Data Protection: Building Universal Windows Apps That Keep Work and Personal Data Separate and Secure", Retrieved on: Jul. 23, 2015 Available at: https://mix.office.com/watch/fd0jojbqv6qx.
"Corrected Notice of Allowance", U.S. Appl. No. 15/266,591, dated Jul. 5, 2017, 2 pages.
"Corrected Notice of Allowance", U.S. Appl. No. 15/266,591, dated Jul. 19, 2017, 2 pages.
"Final Office Action", U.S. Appl. No. 14/788,377, dated May 8, 2017, 20 pages.
"Foreign Office Action", CN Application No. 201380076761.9, dated May 31, 2017, 17 pages.
"Notice of Allowance", U.S. Appl. No. 15/266,591, dated May 11, 2017, 11 pages.
"Notice of Allowance", U.S. Appl. No. 14/481,672, dated Jul. 27, 2017, 7 pages.
"Second Written opinion Issued in PCT Application No. PCT/US2016/054036", dated Aug. 8, 2017, 6 Pages.
"Final Office Action", U.S. Appl. No. 14/221,105, dated Aug. 23, 2017, 41 pages.
"International Preliminary Report on Patentability", Application No. PCT/US2016/039468, dated Oct. 9, 2017, 7 pages.

(56) References Cited

OTHER PUBLICATIONS

"International Preliminary Report on Patentability", Application No. PCT/US2016/054036, dated Nov. 6, 2017, 7 pages.
"Notice of Allowance", U.S. Appl. No. 14/489,288, dated Aug. 25, 2017, 8 pages.
"Notice of Allowance", U.S. Appl. No. 14/533,921, dated Oct. 5, 2017, 9 pages.
"Notice of Allowance", U.S. Appl. No. 14/788,377, dated Sep. 14, 2017, 15 pages.
"PTAB Decision", U.S. Appl. No. 13/898,368, filed Oct. 18, 2017, 6 pages.
"Supplemental Notice of Allowance", U.S. Appl. No. 14/489,288, dated Sep. 8, 2017, 2 pages.
"Notice of Allowance", U.S. Appl. No. 14/788,377, dated Dec. 1, 2017, 13 pages.
"Foreign Office Action", EP Application No. 11871440.1, dated Nov. 21, 2017, 4 pages.

\* cited by examiner

PASSIVE ENCRYPTION OF ORGANIZATION DATA

BACKGROUND

As computing technology has advanced, many different types of computing devices have become commonplace. Portable computing devices have become increasingly popular, with users sometimes bringing their personal computing devices to the workplace and using their personal computing devices for work. Such use can result in situations in which files for work are stored on the user's personal computing device. While this can be helpful for users, it is not without its problems. One such problem is that companies typically want to maintain some control over their data because it oftentimes includes confidential information. This control, however, can conflict with the desired use and full enjoyment of the computing device by the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, whether a file on the computing device, created prior to implementation of a data protection policy, has been written to by a program is detected. Based at least on detecting that the file has been written to by the program, an identifier of the file is added to a file encryption queue. A determination is made whether any programs on the computing device are currently accessing the file, and the file is encrypted based at least on determining that no programs on the computing device are currently accessing the file.

In accordance with one or more aspects, a computing device includes one or more processors, a data store, and one or more computer-readable storage media having stored thereon multiple instructions that, based on execution by the one or more processors, implement an encryption and decryption system that includes an encryption module and an encryption determination module. The encryption module is configured to encrypt a file in the data store, created prior to implementation of a data protection policy on the computing device, based at least on receiving a request from the encryption determination module to encrypt the file. The encryption determination module is configured to detect whether the file in the data store is to be encrypted due to the data protection policy, to communicate to the encryption module to encrypt the file at an appropriate time, and determine the appropriate time using an encrypt on close technique, an encrypt on open technique, an encrypt without exclusive access technique, and an encrypt location technique.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
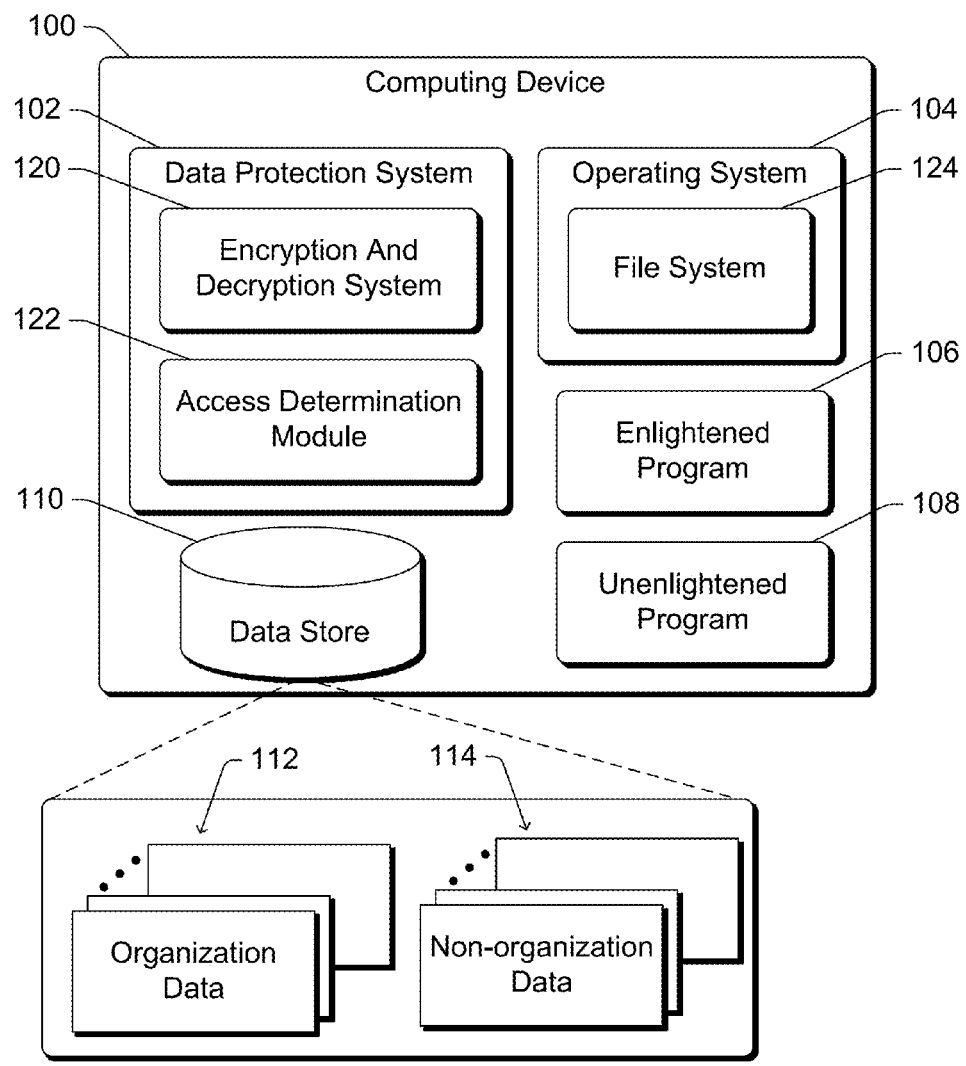
FIG. 1 is a block diagram illustrating an example computing device implementing the passive encryption of organization data in accordance with one or more embodiments.

Passive encryption of organization data is discussed herein. Situations can arise in which data on a computing device is to be protected from access by unauthorized users. Such data is also referred to herein as organization data, and the person or entity desiring to protect the data is referred to herein as an organization. A data protection policy is implemented on the computing device, the data protection policy indicating how the organization data is to be protected. Protection of the organization data includes encrypting the organization data, and allowing the organization data to be decrypted only by particular programs and/or under particular circumstances (as indicated by the data protection policy).

Some organization data can already be stored in files created on the computing device prior to implementation of the data protection policy on the computing device. In such situations, these files already stored on the computing device are encrypted using a passive encryption technique. A passive encryption technique refers to an encryption technique that is designed to encrypt files but operate in a manner such that the encryption interferes little, if any, with the operation of other programs on the computing device. Such an encryption technique operates, for example, in the background or in response to particular conditions being satisfied, rather than stopping all other operation of the program so that data can be encrypted when a data protection policy is applied. The passive encryption technique can include one or more of an encrypt on close technique, an encrypt on open technique, an encrypt without exclusive access technique, and an encrypt location technique.

Generally, the encrypt on close technique refers to a technique in which a file including organization data is encrypted in response to two conditions being satisfied: 1) data is written to the file, and 2) no program (including the program that wrote the organization data to the file) is currently accessing the file. The encrypt on open technique refers to a technique in which a file including organization data is encrypted in response to the file being opened by a program. The encrypt without exclusive access technique refers to a technique in which a file including organization data is encrypted without requiring exclusive access to the file. The encrypt location technique refers to a technique in which files stored in a particular location, such as a particular directory or folder, are encrypted.

Using a passive encryption technique allows the files including organization data to be encrypted and thus protected as desired by the organization, and does so in a way that reduces or eliminates interference with the operation of other programs by the user. Security of the organization data, and thus the computing device storing the organization data, is improved while maintaining usability of the computing device (e.g., reducing performance by a small amount that may not even be noticeable to a user of the computing device).

References are made herein to encryption, decryption, and keys. Encryption and decryption can be performed using symmetric key cryptography as well as public key cryptography with public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key.

FIG. 1 is a block diagram illustrating an example computing device 100 implementing the passive encryption of organization data in accordance with one or more embodiments. The computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device 100 may range from full resource devices with substantial memory and processor resources (e.g., personal computers, game consoles) to low-resource devices with limited memory and/or processing resources (e.g., traditional set-top boxes, hand-held game consoles).

The computing device 100 includes a data protection system 102, an operating system 104, an enlightened program 106, and an unenlightened program 108. The operating system 104 manages the running of various different programs (including the enlightened program 106 and the unenlightened program 108), manages control of various components or other devices, and so forth. The data protection system 102 facilitates enforcing a data protection policy set by an entity, as discussed in more detail below. Although illustrated separately, it should be noted that the data protection system 102 can be included as part of the operating system 104.

Various different organizations (also referred to herein as entities) can desire to set a data protection policy for organization data on the computing device 100. Such organizations can include, for example, an entity (e.g., company, university or other school, government, etc.) that employs a user of the computing device 100 and that desires to keep various data regarding its operations confidential, a user of the computing device 100 that desires to keep various personal information confidential, and so forth. Organization data refers to data that is associated with an organization and that is managed or controlled by the organization. For example, the organization data can be user-entered data or program data, program instructions, binary code, and so forth.

Generally, a data protection policy identifies how organization data is to be protected. The data protection policy can include various settings or rules identifying various different ways in which the organization data is to be protected, such as restrictions on how the plaintext data (unencrypted data) in files can be used, which programs can access the plaintext data, how to identify which programs can use the plaintext data, dates or times when data can be accessed, configurations or settings that a computing device is to have in order to access the data, and so forth. These settings or rules in the data protection policy are specified by the organization and are whatever settings or rules the organization desires.

Organization data is protected by a particular organization by encrypting the data using one or more keys associated with the organization, and decrypting the data when appropriate using a key associated with the entity. The encryption and decryption can be done by invoking an encryption/decryption component of the computing device 100, which may be implemented for example by the data protection system 102 or the operating system 104. The key associated with a particular organization can be maintained locally at the computing device 100, or alternatively obtained from another device or service. Alternatively, the encryption and/or decryption can be performed by another device or service (e.g., a service trusted by the computing device 100 and accessed over a network).

The computing device 100 also includes a data store 110 that can store organization data 112 and/or data that is not organization data (shown as non-organization data 114). The data store 110 includes one or more data storage devices for the computing device 100, such as Flash memory disks, magnetic disks, optical discs, random access memory (RAM), combinations thereof, and so forth. The data storage devices can be fixed or removable devices, and can be included as part of the computing device 100 or coupled to the computing device 100. The organization data 112 optionally includes both encrypted organization data as well as non-encrypted organization data, or alternatively includes just encrypted organization data or just non-encrypted organization data.

In the discussions herein, organization data 112, as well as non-organization data 114, is oftentimes referred to as being data stored in a file (also referred to as a data file). However, it should be noted that the techniques discussed herein can be used with data stored in other manners. For example, the techniques discussed herein can be used analogously for data stored in records or entries of a database.

Organization data 112 can be distinguished from non-organization data 114 in a variety of different manners. In one or more embodiments, a file has corresponding metadata that is stored as part of the file itself This metadata can include an indication of whether the data is organization data (and optionally which of multiple organizations organization data is associated with), such as an identifier of a data protection policy for the data or an identifier of an organization. Additionally or alternatively, an indication of which data is organization data can be maintained in different manners. For example, an indication of which data is organization can be maintained using a table, list or other record that identifies organization data (and optionally which of multiple organization data that data is associated with). By way of another example, different portions of the data store 110 (e.g., different folders or directories of the data store 110), optionally with different portions being associated with different ones of multiple organizations, can be used for organization data than for non-organization data, so any data stored in a portion of the data store 110 used for organization data is assumed to be organization data.

The data protection system 102 includes an encryption and decryption system 120 as well as an access determination module 122. The encryption and decryption system 120 manages the encryption and decryption of organization data. The organization data is decrypted by the system 120 when accessed by a program that is permitted, based on the data protection policy, to access the organization data. The organization data is encrypted by the system 120 at various different times, such as when the organization data is written to the data store 110, as discussed in more detail below.

The access determination module 122 determines whether a program (such as enlightened program 106 or unenlightened program 108) is permitted to access organization data for an organization. A program that is permitted to access organization data is also referred to as an organization program or an enterprise program. Whether a program is permitted to access organization data can be determined in various manners. In one or more embodiments, the access determination module 122 maintains or has access to a list of programs that are permitted to access organization data (optionally different programs for different organizations). In such embodiments, the access determination module 122 determines the program is permitted to access the organization data if the program is on the list, and otherwise determines the program is not permitted to access the organization data. Additionally or alternatively, the access determination module 122 can determine whether an application is permitted to access the organization data in other manners. For example, various rules, properties, criteria, algorithms, and so forth can be applied to determine whether a program is permitted to access the organization data. Such rules, criteria, algorithms, and so forth can be provided by the organization that sets the data protection policy for the organization data, or alternatively by another entity, component, or module. If a program is permitted to access the organization data, then the encryption and decryption system 120 decrypts the organization data using one or more keys. Otherwise, the encryption and decryption system 120 does not decrypt the organization data, and the program is not able to access the plaintext (unencrypted) organization data.

Programs are referred to herein as being enlightened or unenlightened. FIG. 1 illustrates both the enlightened program 106 and the unenlightened program 108, although in some situations the computing device 100 does not include the enlightened program 106, and in some situations the computing device 100 does not include the unenlightened program 108. Furthermore, although a single enlightened program 106 and a single unenlightened program 108 are illustrated in FIG. 1, it should be noted that the computing device 100 can include any number of enlightened programs 106 and/or unenlightened programs 108.

An enlightened program refers to a program that protects data in accordance with the data protection policy for an organization, invoking the functionality of the computing device 100 as appropriate to protect and handle organization data according to the data protection policy for the organization. For example, application programming interface (API) methods exposed by the data protection system 102 can be invoked by the enlightened program 106 to have organization data encrypted and decrypted. The data protection system 102 can allow an enlightened program to access organization data protected by a data protection policy, automatically decrypting the data for the enlightened program and/or decrypting the data in response to a request from the enlightened program, and relying on the enlightened program to have data encrypted as appropriate given the data protection policy.

An unenlightened program refers to a program that does not (or need not) protect data in accordance with the data protection policy for the organization, and lets the data protection system 102 enforce the data protection policy for the organization. For an unenlightened program, the data protection system 102 performs encryption and decryption to maintain the protection on the organization data in accordance with the data protection policy because the data protection system 102 knows that the unenlightened program cannot be relied on to do so. The data protection system 102 decrypts organization data for the unenlightened programs when the organization data is accessed by the unenlightened programs. For example, when data is accessed by the unenlightened program 108, the data protection system 102 is notified (e.g., by the operating system 104), and decrypts the data for the unenlightened program 108.

The data protection system 102 also encrypts data for the unenlightened program 108. This encryption can be performed at different times. For organization data in an already-encrypted file (e.g., a file that was decrypted when accessed by an unenlightened program), the data protection system 102 detects or is notified of the closing of the file by the unenlightened program and encrypts the file at that time. For an already-encrypted file, organization data that is read from the file is decrypted as part of the read operation, but the file remains encrypted and does not need to be re-encrypted when the file is closed. For organization data that is not in an already-encrypted file, the data protection policy 102 determines an appropriate time to encrypt the data using a passive encryption technique. A passive encryption technique refers to an encryption technique that is designed to operate in a manner that interferes little, or any, with the operation of the other programs (e.g., the enlightened program 102 and the unenlightened program 108) on the computing device 100, reducing the performance of other programs on the computing device 100 (e.g., an amount of time that the other programs are scheduled to run, an amount of resources (e.g., processing power or memory) allocated to the other programs) by a small (e.g., less than a threshold amount) amount if at all.

In one or more embodiments, the data protection system 102 supports as a passive encryption technique at least one of an encrypt on close technique, an encrypt on open technique, an encrypt without exclusive access technique, and an encrypt location technique. These different techniques are discussed in more detail below. The data protection system 102 can implement a single one of these techniques, or alternatively can implement two or more of these techniques concurrently. It should be noted that these techniques are used by the data protection system 102 to encrypt files that have been created and stored in the data store 110 prior to the data protection policy being implemented by the data protection system 102 (or prior to the data protection policy indicating that organization data is to be encrypted or protected). For files created after implementation of the data protection policy by the data protection system 102, the data protection system 102 detects or is notified of the creation of file and encrypts the file at the time of creation (or when the file is closed).

The implementation of the data protection policy for organization data refers to the data protection policy for that organization data being activated (e.g., enabled or turned on), such as due to a new data protection policy being provided to the computing device 100, a change in a previous data protection policy (e.g., a change in which programs are organization programs), and so forth.

Encrypting files that have been created and stored in the data store 110 prior to the data protection policy being enforced by the data protection system 102 (or prior to the data protection policy indicating that organization data is to be encrypted or protected) can be challenging in many systems. For example, in situations in which multiple programs can open and access the data in a file concurrently, it can be difficult to encrypt the file.

Figure 2:
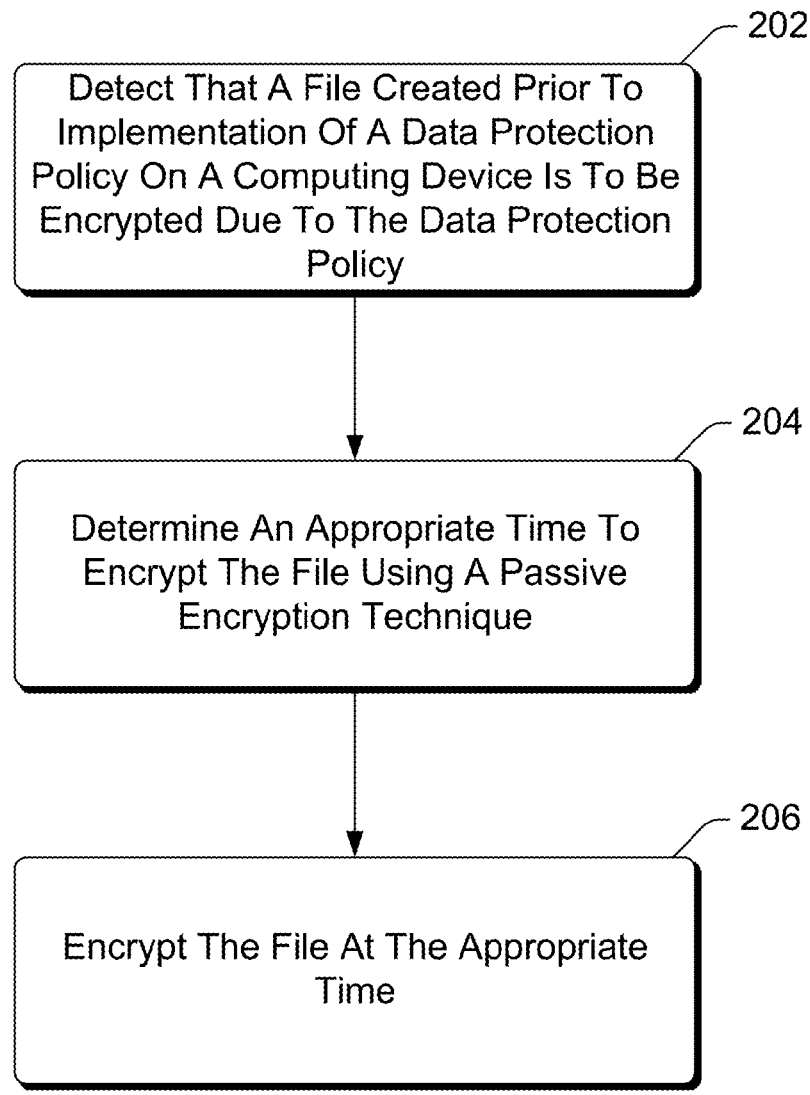
FIG. 2 is a flowchart illustrating an example process for implementing passive encryption of organization data in accordance with one or more embodiments.

FIG. 2 is a flowchart illustrating an example process 200 for implementing passive encryption of organization data in accordance with one or more embodiments. Process 200 is carried out by an encryption and decryption system, such as the encryption and decryption system 102 of FIG. 1, and can be implemented in software, firmware, hardware, or combinations thereof. Process 200 is shown as a set of acts and is not limited to the order shown for performing the operations of the various acts. Process 200 is an example process for implementing passive encryption of organization data; additional discussions of implementing passive encryption of organization data are included herein with reference to different figures.

In process 200, a file that was created prior to implementation of a data protection policy on a computing device and that is to be encrypted due to the data protection policy is detected (act 202). This file is a file that includes organization data. The implementation of the data protection policy can be an initial establishment or beginning enforcement of the data protection policy on the computing device, a change in a previously established or enforced data protection policy on the computing device, and so forth.

Depending on the detection logic that is used, for a given file the data protection system may or may not know whether the file contains organization data. If a file is not known to contain organization data, it is assumed not to contain organization information unless a program known to be an organization program has written data to this file (or, for the encrypt on open technique, opened this file) and/or the source of data being written to the file is known to be an organization source (e.g., a source on an organization network). To summarize, in those cases the decision to encrypt is based on the properties of the program and/or data written to the file rather than properties of the existing file.

An appropriate time to encrypt the file is determined using a passive encryption technique (act 204). The passive encryption technique is designed to reduce or eliminate the impact of the encryption on other programs as discussed above. For example, the passive encryption technique is designed to use a small amount of resources (e.g., processing power, memory) in the computing device and attempt to avoid inconveniently preventing access to the file if encryption requires exclusive access so as not to interfere with other programs in the computing device. These passive encryption techniques include an encrypt on close technique, an encrypt on open technique, an encrypt without exclusive access technique, and an encrypt location technique. These different techniques are discussed in more detail below.

The file is then encrypted at the appropriate time (act 206).

One of the passive encryption techniques is the encrypt on close technique. The encrypt on close technique refers to a technique in which a file including organization data is encrypted by the data protection system 102 in response to two conditions being satisfied: 1) data is written to the file, and 2) no program (including the program that wrote the organization data to the file) is currently accessing the file. The encrypt on close technique reduces the chances of a program running into errors when accessing the file (e.g., due to an attempt to encrypt the file while it is being accessed), and also retains responsiveness of programs (e.g., there is no long delay while other programs wait for all of the files including organization data to be encrypted). The encrypt on close technique can be used, for example, when the design or implementation of the encryption system is such that the encryption system requires exclusive access to a file in order to encrypt the file.

Generally, using the encrypt on close technique, a record is maintained of files that include organization data and that have been written to (and not yet encrypted). Those files are then encrypted at a time when no program is accessing the files. In one or more embodiments, being written to by an organization program is what causes the file to contain organization data, so the file does not necessarily have to initially contain organization data, and if the file does contain organization data, the file does not necessarily need to be written to.

Figure 3:
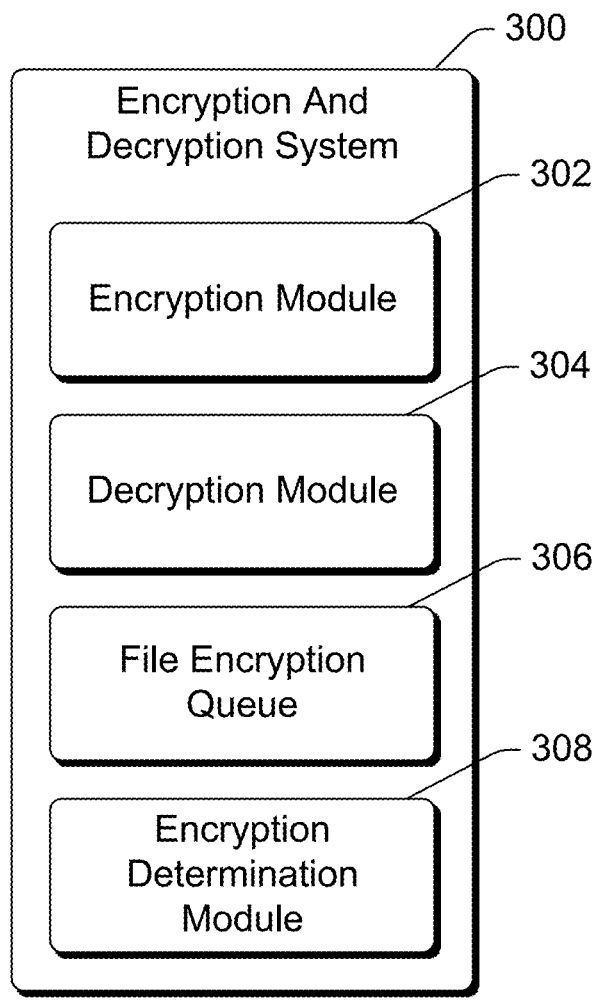
FIG. 3 illustrates an example encryption and decryption system in accordance with one or more embodiments.

FIG. 3 illustrates an example encryption and decryption system 300 in accordance with one or more embodiments. The encryption and decryption system 300 can be the encryption and decryption system 102 of FIG. 1, and vice versa. FIG. 3 is discussed with additional reference to FIG. 1.

The encryption and decryption system 300 includes an encryption module 302, a decryption module 304, a file encryption queue 306, and an encryption determination module 308. In one or more embodiments, the encryption and decryption system 300 implements the encrypt on close technique passive encryption technique.

The encryption module 302 manages encryption of the file. Any of a variety of encryption techniques can be used by the encryption module 302, and the key used to encrypt the file can be obtained from a variety of different sources as discussed above.

The decryption module 304 manages decryption of the file. Any of a variety of decryption techniques can be used by the decryption module 304, and the key used to decrypt the file can be obtained from a variety of different sources as discussed above. The key used to decrypt the file can be the same key, or alternatively a different key, than is used to encrypt the file.

The file encryption queue 306 is a record of files that have been written to by a program but not yet encrypted. An identifier of an unencrypted file is added to the file encryption queue 306 (also referred to as adding the file to the file encryption queue 306) in response to data being written to the unencrypted file. The identifier can be added to the file encryption queue 306 by the encryption determination module 308 or alternatively another component or module. Which files on the data store 110 are encrypted and which files are unencrypted can be determined in various manners, such as by metadata included as part of the files, by a separate record maintained by the encryption and decryption system 300 or a file system 124 of the operating system 104, and so forth.

It should be noted that programs can freely open files for any access rights and the files are not added to the file encryption queue 306 as long as they are not written to. This prevents users from losing access to their personal data which they might accidentally open in organization programs. If a personal file is modified and saved by the user in an organization program, the encryption and decryption system 300 assumes that the file could potentially have organization data and is to be encrypted.

In one or more embodiments, a separate file encryption queue 306 is maintained for (corresponds to) each user of the computing device 100. Different users can log into the computing device 100, and at any given time the encryption and decryption system 300 encrypts files on the file encryption queue 306 corresponding to the user that is currently logged into the computing device 100, and does not encrypt files on the file encryption queue 306 corresponding to other users of the computing device 100. Alternatively, the encryption and decryption system 300 can encrypt files on the file encryption queues 306 of other users not currently logged into the computing device 100, or a single file encryption queue 306 can be used by the encryption and decryption system 300 for all users of the computing device 100.

The encryption determination module 308 determines when to encrypt files in the file encryption queue 306. The encryption determination module 308 determines that a file in the file encryption queue 306 is to be encrypted if there is no program (including the program that wrote organization data to the file) currently accessing the file. Whether any programs are currently accessing the file can be determined in a variety of different manners.

In one or more embodiments, each file has an identifier referred to as a file handle. The file handle uniquely identifies the file within the computing device 100 regardless or independent of where the file is stored on the computing device 100, and is maintained by the operating system 104. In contrast to a file path name, the file handle remains the same regardless of the location of the file in the data store 110. In order to access a file (e.g., to read from or write to the file), a program opens the file handle for the file. Multiple different programs can have the file handle for the file open concurrently. The encryption determination module 308 determines that no program is accessing a file in response to no programs having the file handle open. Whether (and/or how many) programs have a file handle open for a file can be determined by querying the operating system 104, or the encryption determination module 308 can register with the operating system 104 to receive notification from the operating system 104 when no program has a file handle open to the file.

Alternatively, the encryption determination module 308 can determine when no program has a file open in various other manners. Any technique supported by the operating system 104 for keeping track of which programs are accessing which files can be leveraged by the encryption determination module 308 to determine when no program is accessing a particular file. For example, the encryption determination module 308 could request to exclusively access the file so that only the encryption determination module 308 is accessing the file. If the operating system 104 allows such exclusive access, then the encryption determination module 308 knows that the file is not being accessed by any other programs.

In one or more embodiments, the file handles to the files are the identifiers included in the file encryption queue 306. This allows higher resiliency when managing changes to files in the file encryption queue 306 because the file handle for a file, once created, stays constant across modifications, moves and renames. Alternatively, other file identifiers can be used. For example, file path names that identify where the file is stored in the data store 110 can be used as the identifiers included in the file encryption queue 306.

In one or more embodiments, in response to determining that a file is to be encrypted, the encryption determination module 308 opens the file (e.g., opens a file handle to the file). The encryption determination module 308 communicates an indication of the file handle for the file to the encryption module 302, which in turn encrypts the file. As part of encrypting the file, the encrypted file is written back to the data store 110. Upon completing encrypting the file, the encryption module 302 communicates an indication that the encryption is completed to the encryption determination module 308, which in turn closes the file (e.g., closes the file handle to the file) and removes the identifier of the file from the file encryption queue 306. Any other record keeping used by the encryption and decryption system 300 and/or the operating system 104 to determine which files are encrypted is also updated to reflect that the file is now encrypted.

In one or more embodiments, the encryption module 302 encrypts a temporary file rather than the opened file. The opened file is read, the data contained therein encrypted, and the encrypted data is written to the temporary file. The encryption determination module 308 then replaces the opened file with the temporary file (e.g., by notifying the file system 124 to close the file and replace the file with the temporary file, by overwriting the opened file with the temporary file, etc.). By using a temporary file, the encryption process can be interrupted without adverse consequences. For example, if another program requests to access the file with write access while the file is being encrypted, the file system 124 can notify the encryption and decryption system 300 of the request and the encryption and decryption system 300 can abort the encryption process, delete the temporary file, and (optionally) close the file handle for the file so that the other program can access the file.

Alternatively, the encryption determination module 308 can open the file for exclusive access, and the encryption module 302 can complete encryption of the file regardless of whether other programs are requesting access to the file. Thus, in such situations the encryption and decryption system 300 can effectively block access to the file by other programs while the file is being encrypted.

In one or more embodiments, the file encryption queue 306 is stored in a nonvolatile memory (e.g., Flash memory, magnetic disk, etc.) that is updated each time the file encryption queue 306 changes (e.g., a file is added to the file encryption queue 306 or a file on the file encryption queue 306 is encrypted and the file is removed from the file encryption queue 306). The file encryption queue 306 is stored in a protected or secure location of the nonvolatile memory, preventing unauthorized programs (e.g., programs other than the encryption and decryption system 300) from altering the file encryption queue 306. Storing the file encryption queue 306 in nonvolatile memory helps ensure that, in the event of a power loss or reboot, organization data written by a program is eventually encrypted. The file encryption queue 306 in nonvolatile memory persists across reboots of the computing device 100, allowing encryption of files on the file encryption queue 306 to continue after the computing device 100 is rebooted. File system atomicity functionality can also be leveraged to maintain consistency when accessing the file encryption queue 306. A copy of the file encryption queue 306 can also optionally be stored in a volatile memory (e.g., RAM), which may allow faster access to the file encryption queue 306.

In one or more embodiments, the file encryption queue 306 is accessible only to kernel-mode file system drivers (e.g., which may be included as part of the encryption and decryption system 300 or accessed by the encryption and decryption system 300), and cannot be updated without administrative privileges on the computing device 100. This prevents malicious or infected programs (e.g., which would be running in user-mode rather than kernel-mode, and would not have administrative privileges) from adding rogue entries to the queue with the intention of attacking or overloading the computing device.

As discussed above, the access determination module 122 determines whether a program requesting to access organization data in a file is permitted to access the organization data, and if so the decryption module 304 decrypts the file using one or more keys. In situations in which the file is not yet encrypted but is in the file encryption queue 306, access to the file is denied (e.g., by the access determination module 122) even though the file is not yet encrypted. Thus, the data protection system 102 operates to restrict access to the file only to those permitted to access the file even if the file is not yet encrypted.

Additionally, situations can arise in which organization data is to no longer be accessible on the computing device 100, in which case access to the organization data is removed (also referred to as wiping the files that include organization data or wiping the organization data). The encryption and decryption system 300 can be notified of these situations in different manners, such as by receiving a request from a management service coupled to the computing device 100 (e.g., via the Internet or a local area network) to wipe the organization data from the computing device 100, or by a user choice locally or remotely to opt the computing device 100 out of organization management. The organization data is removed by deleting the key used to decrypt the file, thus effectively removing the ability for a program to retrieve the plaintext (unencrypted) organization data. In situations in which there are multiple users of the computing device 100, each such user has his or her own key. If some but not all of the multiple users are to no longer have access to the organization data, then the keys for those users that are to no longer have access to the organization data are deleted. Thus, the users that are to no longer have access to the organization data will no longer have a key allowing the organization data to be decrypted, but other users that are still allowed to access the organization data will have a key allowing the organization data to be decrypted.

In situations in which files are being wiped, but some files are in the file encryption queue 306, simply deleting the key is insufficient to remove access to the files in the file encryption queue 306 because those files are not yet encrypted. In such situations, the encryption and decryption system 300 deletes the files that are in the file encryption queue 306. This deletion can take various forms, such as having identifiers of the files removed from a file directory maintained by the file system 124, having the files securely deleted (e.g., having the portions of the data store 110 where the files are stored overwritten one or more times with other data), and so forth. As part of the deletion process, the identifiers of the files are also removed from the file encryption queue 306. Thus, those files are wiped from the computing device despite not being encrypted yet.

All files in the file encryption queue 306 can be deleted, or alternatively only some of the files in the file encryption queue 306 can be deleted (e.g., those that include organization data for a particular organization). For example, organization data for two organizations may be stored on the computing device, and a request received to wipe organization data for a first of the two organizations but not a second of the two organizations. In this situation, files in the file encryption queue 306 that include organization data for the first organization are wiped from the computing device, but files in the file encryption queue that include organization data for the second organization are not wiped from the computing device.

Figure 4:
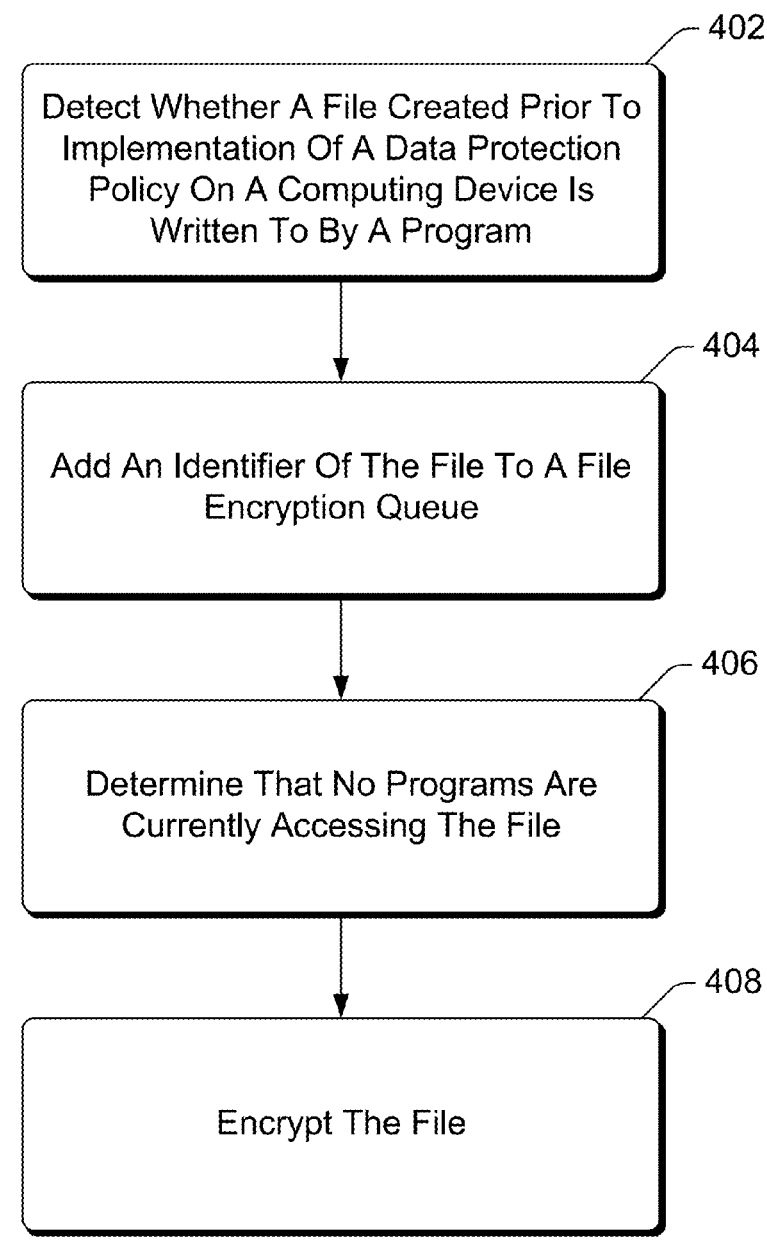
FIG. 4 is a flowchart illustrating an example process for implementing an encrypt on close technique in accordance with one or more embodiments.

FIG. 4 is a flowchart illustrating an example process 400 for implementing an encrypt on close technique in accordance with one or more embodiments. Process 400 is carried out by an encryption and decryption system, such as the encryption and decryption system 102 of FIG. 1 or the encryption and decryption system 300 of FIG. 3, and can be implemented in software, firmware, hardware, or combinations thereof. Process 400 is shown as a set of acts and is not limited to the order shown for performing the operations of the various acts. Process 400 is an example process for implementing an encrypt on close technique; additional discussions of implementing an encrypt on close technique are included herein with reference to different figures.

In process 400, whether a file that was created prior to implementation of a data protection policy on a computing device has been written to is detected (act 402). The implementation of the data protection policy can be an initial establishment or beginning enforcement of the data protection policy on the computing device, a change in a previously established or enforced data protection policy on the computing device, and so forth. It should be noted that the detection in act 402 is of a file that is or has been written to—a file that is read, but not written to, is not detected in act 402.

An identifier of the file detected in act 402 is added to a file encryption queue (act 404) based at least on detecting that the file is or has been written to. The identifier can be a file handle or other identifier as discussed above.

A determination is subsequently made whether any programs are currently accessing the file (act 406). This determination can be made in a variety of different manners, such as by determining when no programs have an open file handle for the file.

The file is encrypted (act 408) based at least on determining that no programs on the computing device are currently accessing the file. The file can then be treated by the operating system and the data protection system as any other encrypted file that was created after implementation of the data protection policy. In act 408, the file can be exclusively accessed for encryption so that any other programs requesting access to the file are blocked from accessing the file while the file is being encrypted. Alternatively, the encrypting of the file can be aborted in response to a request by another program to access the file. If encrypting of the file is aborted, the identifier of the file remains in the file encryption queue. After the file has been successfully encrypted, the identifier of the file is removed from the encryption queue.

The encrypt on close technique takes a passive approach to encrypting organization data at the cost of delaying encryption for a relatively negligible amount of time. Files are only encrypted when they are actually written to, and only when they are not being accessed by other programs on the computing device. This reduces the chances of a program running into errors when accessing the file and retains responsiveness of applications, while also providing security of the organization data as desired by the data protection policy.

Referring again to FIG. 1, the data protection system 102 can implement passive encryption techniques other than the encrypt on close technique. These other passive encryption techniques can be implemented in place of, or concurrently with, the encrypt on close technique. As discussed above, these other techniques include an encrypt on open technique, an encrypt without exclusive access technique, and an encrypt location technique.

The encrypt on open technique refers to a technique in which a file including organization data is encrypted by the data protection system 102 in response to the file being opened by a program. In one or more embodiments, the encrypt on open technique is implemented using the encryption and decryption system 300 of FIG. 3, although no file encryption queue 306 need be included in the encryption and decryption system 300. In response to a request from a program to open a file that has not been encrypted, the encryption determination module 308 is notified of the request (e.g., by the operating system 104). The encryption determination module 308 makes an adjudication and, if encryption is needed, opens the file and obtains exclusive access to the file, notifies the encryption module 302 to encrypt the file, and upon completion of encryption notifies the operating system 104 that the encryption determination module 308 is finished processing the file. The file, now encrypted, can then be opened by the program, and is treated by the operating system as any other encrypted file that was created after implementation of the data protection policy. Note that other embodiments could choose to have the encryption module 302 obtain exclusive access to the file, instead of the encryption determination module 308.

The encrypt on open technique maintains protection of organization data in files as desired by the data protection policy, although can reduce the performance and responsiveness of the program accessing the file relative to the encrypt on close technique. Nonetheless, the encrypt on open technique improves security of the organization data, and thus of the computing device 100, and prevents access to a file including organization data regardless of whether the file is being written to. The encrypt on open technique can be used, for example, when the design or implementation of the encryption system is such that the encryption system requires exclusive access to a file in order to encrypt the file.

The encrypt without exclusive access technique refers to a technique in which a file including organization data is encrypted by the data protection system 102 without requiring exclusive access to the file. In one or more embodiments, the encrypt without exclusive access technique is implemented using the encryption and decryption system 300 of FIG. 3, although no file encryption queue 306 need be included in the encryption and decryption system 300. The encrypt on close technique discussed above accounts for situations in which the encryption module 302 can only encrypt a file if the encryption module 302 has exclusive access to (has opened an exclusive file handle for) the file—no other programs can be accessing the file while the file is being encrypted by the encryption module 302. Using the encrypt without exclusive access technique, however, the encryption and decryption system 300 is implemented to allow encryption of a file without requiring exclusive access to the file. Such an implementation of the encryption and decryption system 300 includes maintaining per-file metadata that identifies encryption progress (allowing different parts of the file to be encrypted at different times), encrypting file contents on disk without a conventional file handle (e.g., using a temporary file), as well as maintaining file system level consistency and performance so that changes to the file by one program are reflected in the encrypted file being created.

The encrypt without exclusive access technique maintains protection of organization data in files as desired by the data protection policy. Security of the organization data, and thus of the computing device 100, is improved. Furthermore, delays due to waiting for a file to be opened or closed need not be incurred—any file including organization data can be encrypted in response to implementation of the data protection policy regardless of which, if any, programs are accessing the file.

The encrypt location technique refers to a technique in which files stored in a particular location, such as a particular directory or folder, are encrypted. In one or more embodiments, the encrypt location technique is implemented using the encryption and decryption system 300 of FIG. 3, although no file encryption queue 306 need be included in the encryption and decryption system 300. Using the encrypt location technique, the files including organization data are stored only in particular locations by programs permitted to access the organization data, such as in particular directories or folders. Thus, the encryption and decryption system 300 assumes that any file stored in one of those particular locations includes organization data and is to be encrypted. The encryption determination module 308 determines to encrypt a file in the particular location whenever a file is created in or moved to the particular location. The file can be encrypted in response to the data protection policy being implemented on the computing device, which can include a program becoming permitted to access the organization data (as indicated by a change in the data protection policy). It should be noted that more than one location could be denoted this way. Embodiments of the encrypt location method could also have additional rules or restrictions on whether to encrypt data in the particular location.

The encrypt location technique maintains protection of organization data in files as desired by the data protection policy. Security of the organization data, and thus of the computing device 100, is improved. Furthermore, delays due to waiting for a file to be opened or closed need not be incurred—any file stored in the particular location is encrypted regardless of when opened or closed by a program on the computing device.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
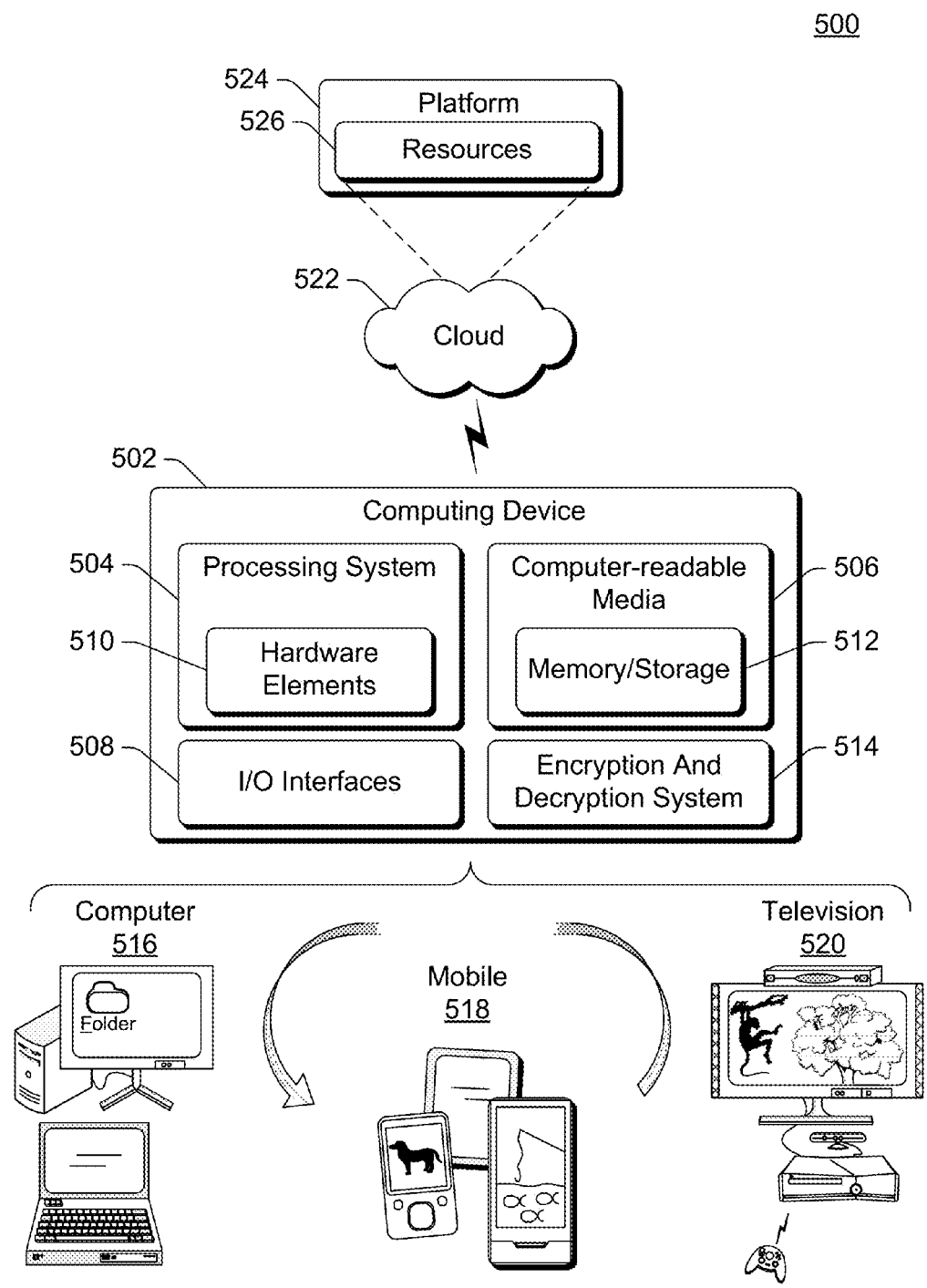
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes an encryption and decryption system 514. The encryption and decryption system 514 provides passive encryption of organization data as discussed above. The encryption and decryption system 514 can implement, for example, the encryption and decryption system 120 of FIG. 1, or the encryption and decryption system 300 of FIG. 3.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: detecting whether a file on the computing device, created prior to implementation of a data protection policy, has been written to by a first program; adding, based at least on detecting that the file has been written to by the first program, an identifier of the file to a file encryption queue; determining whether any programs on the computing device are currently accessing the file; and encrypting the file based at least on determining that no programs on the computing device are currently accessing the file.

Alternatively or in addition to any of the above described methods, any one or combination of: the method further comprising allowing the first program to open and read the file without adding the file to the file encryption queue; the method further comprising storing the file encryption queue in a nonvolatile memory that persists in the file encryption queue across reboots of the computing device; the identifier of the file comprising a file handle that uniquely identifies the file within the computing device independent of the location where the file is stored on the computing device; the method further comprising receiving a request to wipe organization data for an organization from the computing device, identifying one or more files in the file encryption queue that include the organization data for the organization, and deleting the identified one or more files from a data store of the computing device; the method further comprising blocking access to the file by any additional programs on the computing device while encrypting the file; the method further comprising determining whether access to the file is requested by a second program on the computing device while encrypting the file, aborting the encrypting based at least on determining that access to the file is requested by the second program while encrypting the file, and allowing the second program to access the file; the method further comprising removing the file from the encryption queue after the file is encrypted, receiving, from a second program, a request to access the file while the file is in the file encryption queue, and denying the second program access to the file.

A computing device comprising: one or more processors; a data store; and one or more computer-readable storage media having stored thereon multiple instructions that, based on execution by the one or more processors, implement an encryption and decryption system that includes an encryption module and an encryption determination module; the encryption module configured to encrypt a file in the data store, created prior to implementation of a data protection policy on the computing device, based at least on receiving a request from the encryption determination module to encrypt the file; the encryption determination module configured to: detect whether the file in the data store is to be encrypted due to the data protection policy, communicate to the encryption module to encrypt the file at an appropriate time, and determine the appropriate time using an encrypt on close technique, an encrypt on open technique, an encrypt without exclusive access technique, and/or an encrypt location technique.

Alternatively or in addition to any of the above described computing devices, any one or combination of: the encrypt on close technique comprising a technique in which the file is encrypted based at least on a first condition and a second condition both being satisfied, the first condition being that data is written to the file after implementation of the data protection policy, and the second condition being that no program is currently accessing the file; the encryption determination module further configured to allow programs to open and read the file without communicating to the encryption module to encrypt the file; the computing device further comprising a nonvolatile memory that stores a file encryption queue, the file encryption queue including file identifiers of files that have been detected as to be encrypted due to the data protection policy and that have been written to after implementation of the data protection policy, the file encryption queue persisting file identifiers across reboots of the computing device; the encrypt on open technique comprising a technique in which the file is encrypted based at least on the file being opened by a program on the computing device; the encrypt without exclusive access technique comprising a technique in which the file is encrypted without requiring the encryption module to have exclusive access to the file; the encrypt location technique comprising a technique in which the file is encrypted based at least on the file being stored in a particular location of the data store.

A computing device comprising: one or more processors; a data store; a nonvolatile memory storing a file encryption queue; and one or more computer-readable storage media having stored thereon multiple instructions that, based on execution by the one or more processors, implement an encryption and decryption system that includes an encryption module and an encryption determination module; the encryption module configured to encrypt a file, created prior to implementation of a data protection policy on the computing device, based at least on a request from the encryption determination module to encrypt the file; the encryption determination module configured to: detect whether the file has been written to by a first program, add, based at least on the file having been written to by the first program, an identifier of the file to the file encryption queue, determine whether any programs on the computing device are currently accessing the file, and communicate the request to the encryption module to encrypt the file based at least on determining that no programs on the computing device are currently accessing the file.

Alternatively or in addition to any of the above described computing devices, any one or combination of: the encryption determination module further configured to allow the first program to open and read the file without adding the file to the file encryption queue; the non-volatile memory persisting the file encryption queue across reboots of the computing device; the encryption determination module further configured to determine whether access to the file is requested by a second program while the encryption module is encrypting the file, abort the encrypting based at least on determining that access to the file is requested by the second program while encrypting the file, and allow the second program to access the file; the encryption determination module further configured to receive a request to wipe organization data for an organization from the computing device, identify one or more files in the file encryption queue that include the organization data for the organization, and delete the identified one or more files from a data store of the computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   detecting whether a file on the computing device, created prior to implementation of a data protection policy of an organization, has been written to by a first program that is permitted to access data associated with the organization;
   adding, based at least on detecting that the file has been written to by the first program, an identifier of the file to a file encryption queue;
   determining whether any programs on the computing device are currently accessing the file;
   initiating encryption of the file based at least on determining that no programs on the computing device are currently accessing the file;
   determining whether access to the file is requested by a second program on the computing device during encryption of the file;
   aborting encryption of the file based at least on determining that access to the file is requested by the second program during encryption of the file; and
   allowing the second program to access the file.

2. The method of claim 1, further comprising allowing the first program to open and read the file without adding the file to the file encryption queue.

3. The method of claim 1, further comprising storing the file encryption queue in a nonvolatile memory that persists across reboots of the computing device.

4. The method of claim 1, the identifier of the file comprising a file handle that uniquely identifies the file within the computing device independent of the location where the file is stored on the computing device.

5. The method of claim 1, further comprising:
receiving a request to wipe organization data for the organization from the computing device;
identifying one or more files in the file encryption queue that include the organization data for the organization; and
deleting the identified one or more files from a data store of the computing device.

6. The method of claim 1, further comprising removing the identifier of the file from the file encryption queue after the file is encrypted.

7. The method of claim 1, wherein the implementation of the data protection policy is one of: an initial establishment of the data protection policy or a change in the data protection policy.

8. The method of claim 1, wherein initiating encryption of the file comprises writing data from the file to a temporary file, and aborting encryption of the file comprises deleting the temporary file.

9. A computing device comprising:
one or more processors;
a data store; and
one or more computer-readable storage media having stored thereon multiple instructions that, based on execution by the one or more processors, implement an encryption and decryption system that includes an encryption module and an encryption determination module;
the encryption module configured to encrypt a file in the data store, created prior to implementation of a data protection policy of an organization on the computing device, based at least on receiving a request from the encryption determination module to encrypt the file; and
the encryption determination module configured to:
detect whether the file in the data store is to be encrypted due to the data protection policy by determining whether the file has been written to by a first organization program,
communicate to the encryption module to encrypt the file at an appropriate time,
determine the appropriate time using an encrypt on close technique, an encrypt on open technique, an encrypt without exclusive access technique, and/or an encrypt location technique,
initiate encryption of the file,
determine whether access to the file is requested by a second organization program on the computing device during encryption of the file,
abort encryption of the file based at least on determining that access to the file is requested by the second organization program during encryption of the file, and
allow the second organization program to access the file.

10. The computing device of claim 9, the encrypt on close technique comprising a technique in which the file is encrypted based at least on a first condition and a second condition both being satisfied, the first condition being that data is written to the file after implementation of the data protection policy, and the second condition being that no program is currently accessing the file.

11. The computing device of claim 10, the encryption determination module further configured to allow programs to open and read the file without communicating to the encryption module to encrypt the file.

12. The computing device of claim 10, further comprising a nonvolatile memory that stores a file encryption queue, the file encryption queue including file identifiers of files that have been detected as to be encrypted due to the data protection policy and that have been written to after implementation of the data protection policy, the file encryption queue persisting file identifiers across reboots of the computing device.

13. The computing device of claim 9, the encrypt on open technique comprising a technique in which the file is encrypted based at least on the file being opened by a program on the computing device.

14. The computing device of claim 9, the encrypt without exclusive access technique comprising a technique in which the file is encrypted without requiring the encryption module to have exclusive access to the file.

15. The computing device of claim 9, the encrypt location technique comprising a technique in which the file is encrypted based at least on the file being stored in a particular location of the data store.

16. A computing device comprising:
one or more processors;
a data store;
a nonvolatile memory storing a file encryption queue; and
one or more computer-readable storage media having stored thereon multiple instructions that, based on execution by the one or more processors, implement an encryption and decryption system that includes an encryption module and an encryption determination module;
the encryption module configured to encrypt a file created prior to implementation of a data protection policy of an organization on the computing device, based at least on a request from the encryption determination module to encrypt the file;
the encryption determination module configured to:
detect whether the file has been written to by a first program that is permitted to access data associated with the organization,
add, based at least on the file having been written to by the first program, an identifier of the file to the file encryption queue,
determine whether any programs on the computing device are currently accessing the file,
communicate the request to the encryption module to encrypt the file based at least on determining that no programs on the computing device are currently accessing the file,
determine whether access to the file is requested by a second program during encryption of the file by the encryption module,
abort encryption of the file based at least on determining that access to the file is requested by the second program during encryption of the file, and
allow the second program to access the file.

17. The computing device of claim 16, the encryption determination module further configured to allow the first program to open and read the file without adding the file to the file encryption queue.

18. The computing device of claim 16, the non-volatile memory persisting the file encryption queue across reboots of the computing device.

19. The computing device of claim 16, the encryption determination module further configured to remove the identifier of the file from the file encryption queue after the file is encrypted.

20. The computing device of claim 16, the encryption determination module further configured to:
   receive a request to wipe organization data for the organization from the computing device;
   identify one or more files in the file encryption queue that include the organization data for the organization; and
   delete the identified one or more files from the data store of the computing device.

* * * * *